United States Patent
McClelland et al.

(10) Patent No.: US 6,822,379 B2
(45) Date of Patent: Nov. 23, 2004

(54) EMISSION DEVICE AND METHOD FOR FORMING

(75) Inventors: Paul H. McClelland, Monmouth, OR (US); David L. Neiman, Corvallis, OR (US); Steven Leith, Albany, OR (US); Niranjan Thirukkovalur, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 255 days.

(21) Appl. No.: 10/262,808

(22) Filed: Oct. 1, 2002

(65) Prior Publication Data

US 2004/0061432 A1 Apr. 1, 2004

(51) Int. Cl.$^7$ .................................................. H01J 1/02
(52) U.S. Cl. ...................................... 313/309; 313/495
(58) Field of Search ................................. 313/309, 336, 313/351, 495, 497

(56) References Cited

U.S. PATENT DOCUMENTS

| 3,665,241 A | 5/1972 | Spindt et al. |
| 5,773,920 A * | 6/1998 | Shaw et al. ................. 313/309 |
| 6,353,286 B1 | 3/2002 | Talin et al. |
| 6,369,496 B1 | 4/2002 | Yoshiki |

* cited by examiner

*Primary Examiner*—Vip Patel

(57) ABSTRACT

An emission device includes a plurality of electron emitter structures of varied geometry that have a conducting layer deposited thereon. The conducting layer has openings located at tunneling sites for each of the electron emitter structures. The tunneling sites facilitate electron emissions from each of the varied geometry electron emitter structures upon voltage biasing of the conducting layer relative to the electron emitter structures.

27 Claims, 6 Drawing Sheets

EMISSION DEVICE AND METHOD FOR FORMING

FIELD OF THE INVENTION

The invention is in the microelectronics field. The invention particularly concerns emitters and devices incorporating emitters.

BACKGROUND OF THE INVENTION

Controllable electron sources, such as sub-micron cold cathode emitters, have a wide range of potential applicability in the microelectronics field. These electron sources find particular use in displays, analytical instruments, sensors, micro-array electron beam lithography tools, and memory devices. Electron sources are often grouped according to whether they are heated sources or cold sources. Heated sources or cathodes are usually mixed oxide thermionics or Schottky type devices. Cold sources or cathodes include radioactive decay sources, sharp point devices such as "Spindt" tips, silicon etched tips, carbon nanotubes and flat emitters. Non-radioactive cold cathodes emit electrons by extracting electrons from a source layer by the application of a sufficient electric field. Cold cathodes emit electrons by quantum tunneling of electrons.

Emitters require architectures that have, at a minimum, three layers for enabling controlled electron emissions, which form a basis for creation of a range of useful electrical and optical effects. These layers include an electron source layer, an insulator layer, and a conducting layer or extractor. A voltage source connected between the conducting layer and the source layer creates an electric field which causes electron emissions from the source layer.

As emitter size has become smaller and smaller to facilitate integration with IC circuits and devices, problems have occurred with the fabrication of submicron cold cathode emitters. Emitter formation processes typically produce emitter structures having varied heights, shapes and locations. Some emitter structures may be shorted or remain unexposed as a result of the varied heights, shapes and locations.

SUMMARY OF THE INVENTION

According to the invention, an emission device for generating an electron emission current comprises a plurality of electron emitter structures having varied geometries. Each of the electron emitter structures includes one or more tunneling sites which provide an electron emission current. The emission device further includes a conducting layer that can be voltage biased relative to the plurality electron emitter structures to induce the electron emission current from tunneling sites of the electron emitter structures. The conducting layer includes openings at the tunneling sites to facilitate electron emission.

DETAILED DESCRIPTION OF THE INVENTION

An emitter or electron emission device is disclosed having an increased number of electron emitter structures available for providing an electron emission current, which can flow through emission or tunneling sites of the electron emitter structures. The electron emitter structures have varied geometries and include an electron source that provides electrons for emission. The electrons are extracted from the source layer by the application of a sufficient electric field gradient, and provide an emission current for different purposes. For example, in display devices, the emission current can energize pixels to provide a display. A feature of the present invention is that each of the emission sites, which can have variations in height, width, and/or location on the source layer, is individually opened and available for electron emission.

Figure 1A:
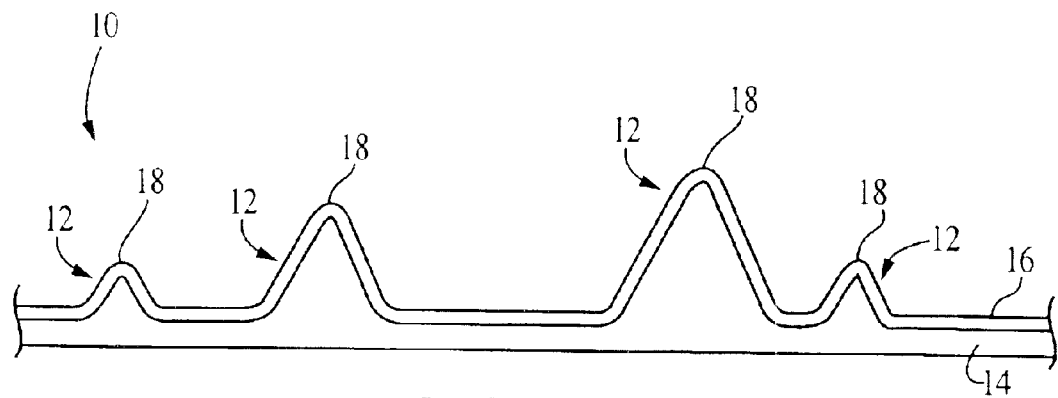
FIGS. 1A–1B are schematic cross-section views illustrating intermediate structures resulting from process steps for forming a preferred embodiment emission device of the present invention.
Figure 1B:
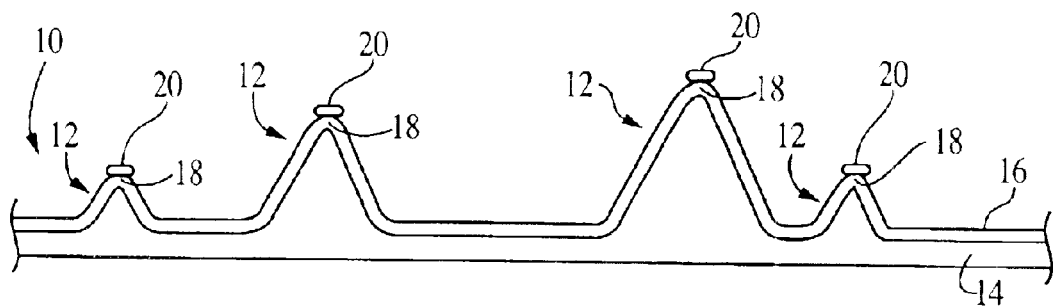
Figure 1C:
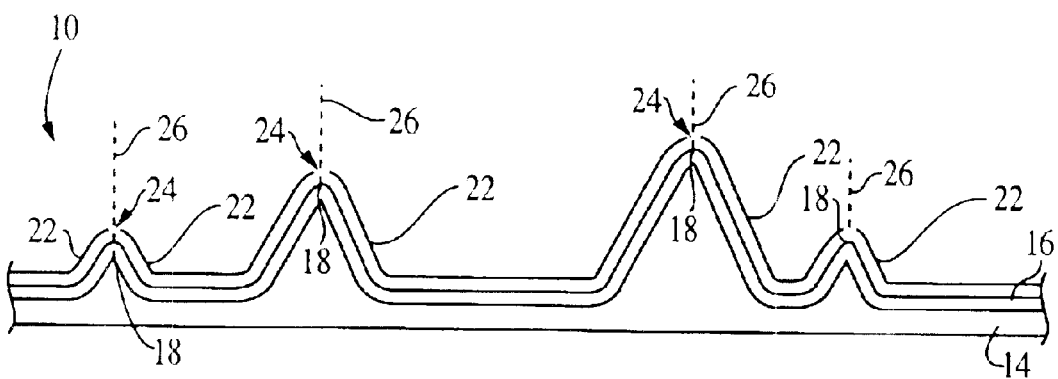
FIG. 1C is a schematic cross-section of a preferred emission device resulting from completion of preferred process steps for forming an emission device.

Turning now to the drawings, intermediate structures (FIGS. 1A–1B) and a finished structure (FIG. 1C) produced by process steps for forming an emission device or emitter 10 having a plurality of electron emitter structures 12 of varied geometries are shown in cross-section. The illustrated electron emitter structures 12 are formed of an electron source layer 14, e.g., a polysilicon source layer, and an insulating layer 16 that is grown on the electron source layer 14. The electron emitter structures 12, due to the nature of conventional formation processes, are formed having variations in height, width, and/or location on the electron source layer 14. In particular, the present invention takes advantage of this varied geometry of the electron emitter structures 12 to improve electron emissions. FIGS. 1A–1C illustrate exemplary variations in height and location of the electron emitter structures 12. The emitter structures 12 further include emission or tunneling sites 18 that electrons pass through to escape the insulating layer 16.

For identification of the emission sites 18, markers 20 are deposited on each of the plurality of electron emitter structures 12 as shown in FIG. 1B. That is, since the formation process of depositing the electron source layer 14 and the insulating layer 16 incurs randomness in the formation of the electron emitter structures 12, the markers 20 are deposited so that they identify the emission sites 18 of the structures. FIG. 1C shows a conducting layer 22 deposited on the insulating layer 16. The conducting layer 22 has openings 24 at the emission sites 18 which occur after the removal of the markers 20 from the plurality of electron emitter structures 12. Upon application of a voltage potential between the conducting layer 22 and the electron source layer 14, the plurality of electron emitter structures 12 emit electrons from the emission sites 18 to form emission currents 26.

A preferred process of forming an emission device is initiated by forming conically-shaped spindt tip type cold cathode emitter structures 12 as shown in FIG. 1A upon an electron source layer/substrate 14. The emitters 12 have an insulating layer 16 grown thereon. Markers 20 are then deposited on the tunneling sites 18, which are generally located at the tips of the electron emitter structures 12. A thin conducting layer 22 is deposited on the insulating layer 16 and at least a portion of the markers 20. The markers are then baked out or removed from the emission device 10 to provide openings 24 in the conducting layer 22 at the emission sites 18.

The markers 20 preferably comprise an electrodeposited polymer. For example, in a reduced pressure gaseous environment or plasma media, trimethylsilane will polymerize at each of the tunneling sites 18 and create a nodule of organosilicon polymer. In a methyl alcohol solution, acrylonitrile is polymerized by electrolysis to create polymer markers 20 at the tunneling sites 18. Other materials, including metals like Cu, Sn, Au, and Ni can also be used to form markers 20 over the tunneling sites 18 prior to deposition of the conducting layer 22. Further, polymerization of anions such as $CrO_4^{-2}$ or $CrO_7^{-2}$ can be used to form markers 20. By way of example, $CrO_4^{-2}$ chromate anions in the presence of solutions having approximately a 0.01–1.0% polyvinyl alcohol solution, 25% isopropyl alcohol, 25% dimethyl sulfoxide, and the balance water have the anions reduced to chromic $Cr^{+3}$ and chromos $Cr^{+2}$ ions, which complex the polyvinyl alcohol at each of the tunneling sites 18 to form gelatinous coatings or markers 20.

The insulating layer 16 of the electron emitter structures 12 preferably comprises an oxide or a nitride of Si, Al, or Ta. For example, the layer 16 may comprise a material of the formula $AB_x$ where A is one of Si or Ti, B is nitrogen or oxygen, and where x is any number from 1 to 3. The layer 16 can also be formed of a dielectric material. In other embodiments, carbides may also be used to form the insulating layer 16. The electron source layer 14 may comprise any of a plurality of suitable materials, with semi-conductors and conductors such as metals and metallic compounds being examples. By way of particular example, the electron source layer 14 may comprise silicon or polysilicon, such as a N++ doped silicon wafer, or the like. The thicknesses of the electron source layer 14 and the insulating layer 16 will be selected depending on factors such as the end use application for the emitter 10, the materials used for construction of the layers 14–16, and the like.

Designers applying the invention will understand that an optimized thickness of the insulating layer 16 produces maximum emission efficiency. Thinner layers reduce the tunneling resistance of the insulating layer 16 and produce emissions at lower voltages, while increasing the thickness of the insulating layer will increase its tunneling resistance. If the insulating layer 16 is too thin, high leakage current and electric shorting are possible, while if is too thick, the emission current will be greatly reduced. A willingness to allow higher voltages will permit the use of thicker layers, while a need to limit voltages will call for a thinner layer. In sum, when lower voltages are critical, thinner layers produce emissions at lower voltages with minimum layer thicknesses determined by the work function of the emission material. When higher voltages are possible, thicker layers produce increased emissions. By way of reference, it is believed that a useful thickness range for the insulating layer 16 for many applications will be between about 0.01 micron and about 1 micron.

Preferably, the conducting layer 22 is a thin metal layer which is formed on the insulating layer 16. The thin metal layer 22 can be formed of a metal or alloy, with a preferred thin metal layer comprising a Pt layer. Alternate preferred materials are Al, Au, Ta, Sn, and combinations of Pt, Au or Ta. Other useful metals include Mo, Ir, Ru, and Cr. However, it is contemplated that other metals and alloys of these metals can be used. The thin metal layer should be of a thickness large enough to provide a sufficient electric field and yet be small enough so as to facilitate electron emissions from the source layer 14. Artisans will appreciate that the thickness of the thin metal layer 22 may be selected according to various design factors such as applied bias voltage, thickness of the insulating layer 16, materials of construction, end use of the emitter, and the like. By way of example, a practical thickness range for the thin metal layer 22 may be between about 50 to about 100 Angstroms. In addition to the thin metal layer 22, one or more additional layers (not shown) can be layered over the thin metal layer. These additional layers may comprise conducting and/or insulating layers. For example, one or more of the additional layers may function as an electrical contact for communicating a voltage potential to the thin metal layer 22.

In operation of the emitter 10, quantum tunneling of electrons from the electron source layer 14 through the insulating layer 16 causes an emission of electrons from the tunneling sites 18 at the emitter structure's tips when a voltage bias is applied between the conducting layer 22 and the source layer 14. The electrons are emitted through the openings 24 in the thin metal layer 22 to form emission currents 26 from each of the plurality of electron emitter structures 12. In one embodiment, the conducting 22 is formed with a single opening for each of the plurality of electron emitter structures 12.

There are a wide-range of potential uses of emission devices of the invention such as the emitter 10 of FIG. 1 due to the general utility of emissions as a basis for electrical, electrochemical, and electro optical effects. Further, emitters of the invention are easily incorporated into integrated circuit fabrication techniques. A few particularly preferred applications of the emitter will now be discussed by way of example.

Figure 2:
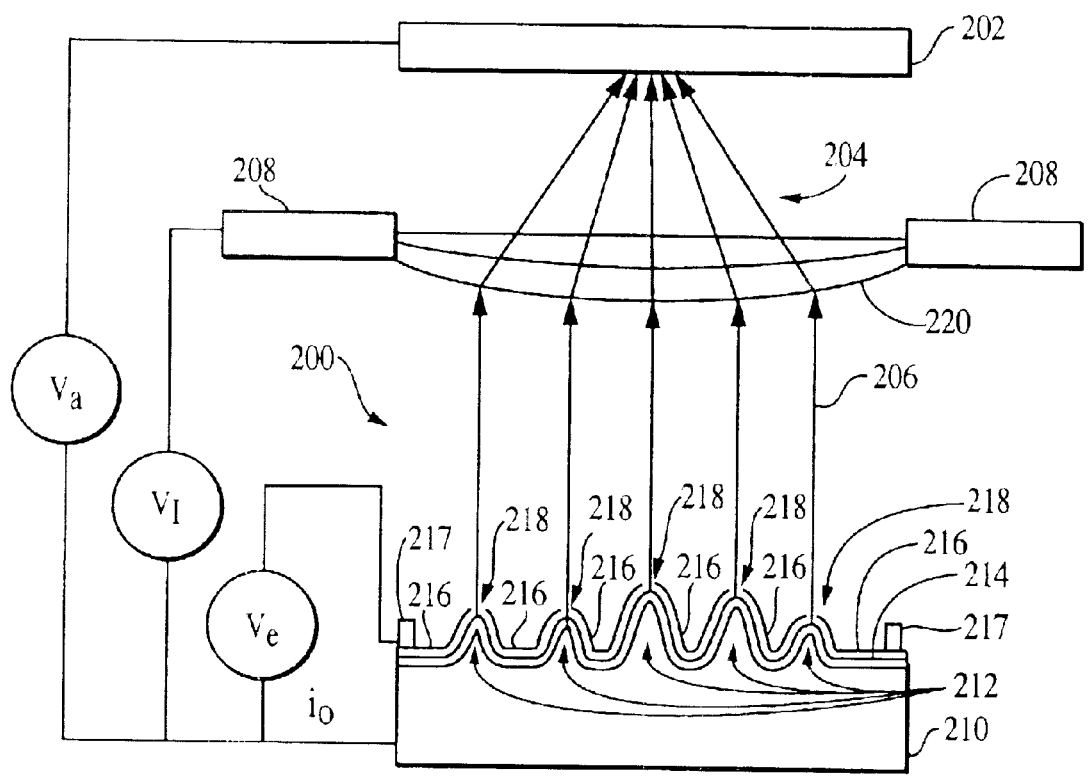
FIG. 2 is a schematic of a preferred embodiment emission device of the invention.

FIG. 2 is an exemplary schematic of a preferred application of an emission device or emitter 200 where a target anode medium 202 receives focused emissions 204. In this application, the emissions 206 from the emitter 200 of the invention are focused by an electrostatic focusing device or lens 208. The emitter 200 generally comprises an electron source layer 210, which includes a plurality of electron emitter structures 212, an insulating layer 214, a conducting layer 216, and a circuit interconnect contact structure 217 located on the conducting layer. Application of a voltage $V_e$ potential between the conducting layer 216 and the electron source layer 210 establishes an electric field between the source layer 210 and the conducting layer 216. This electric field enables electrons to travel by a quantum tunneling mechanism through the insulating layer 214 from which they will be emitted 206 and focused by the lens 208.

For example, with the target anode medium 202 being a recordable memory medium for a storage device, $V_a$ might be chosen to be between 500 and 2000 volts. Within the lens 208, an aperture 220 in a conductor can be set at a predetermined voltage that can be adjusted to change the focusing effect of the lens 208. Those skilled in the art will appreciate that the lens 208 can be made from more than one conductor layer to create a desired focusing effect. The emissions 206 are focused by the lens 208 into a focused beam 204 directed onto a target anode medium 202. The target anode medium 202 is set at an anode voltage $V_a$. The magnitude of $V_a$ will depend on the intended emitter use, the distance between the anode medium 202 and the emitter 200, as well as other factors.

The lens 208 focuses the electron emissions 206 by forming an electric field in the aperture 220 in response to a voltage $V_I$ within its aperture. If $V_I$ is set at a proper voltage difference from $V_e$, the emitted electrons 206 from the emitter 200 are focused towards a focal point of the aperture 220 and attracted to the anode medium 202 to form the focused beam 204.

The anode medium 202 may be configured as appropriate for any of several emitter applications, with two preferred applications including a visual display and a memory. In these two applications, the medium 202 will be a visual display medium and a memory medium, respectively. If the anode medium 202 comprises a display, the focusing of the beam onto the anode medium 202 can be used to produce an effect to stimulate a visual display. Similarly, if the anode medium 202 comprises a memory medium, the electrochemical properties of the medium may be changed through the focused beam 204. These changes may be "coded" in a binary or other manner to store retrievable information, for instance by spatially organizing portions of the anode medium 202 and then selectively changing some of those portions through the emitted electrons 204. A visual display medium and a memory medium may employ a plurality of emitters 200 arranged in an array, and may employ a mover such as a micro-positioner driven by a motor for moving one or the other of the emitter 200 and the anode medium 202 relative to the other. Also, a control circuit may be used to control the emitter 200 and/or other components.

Figure 3:
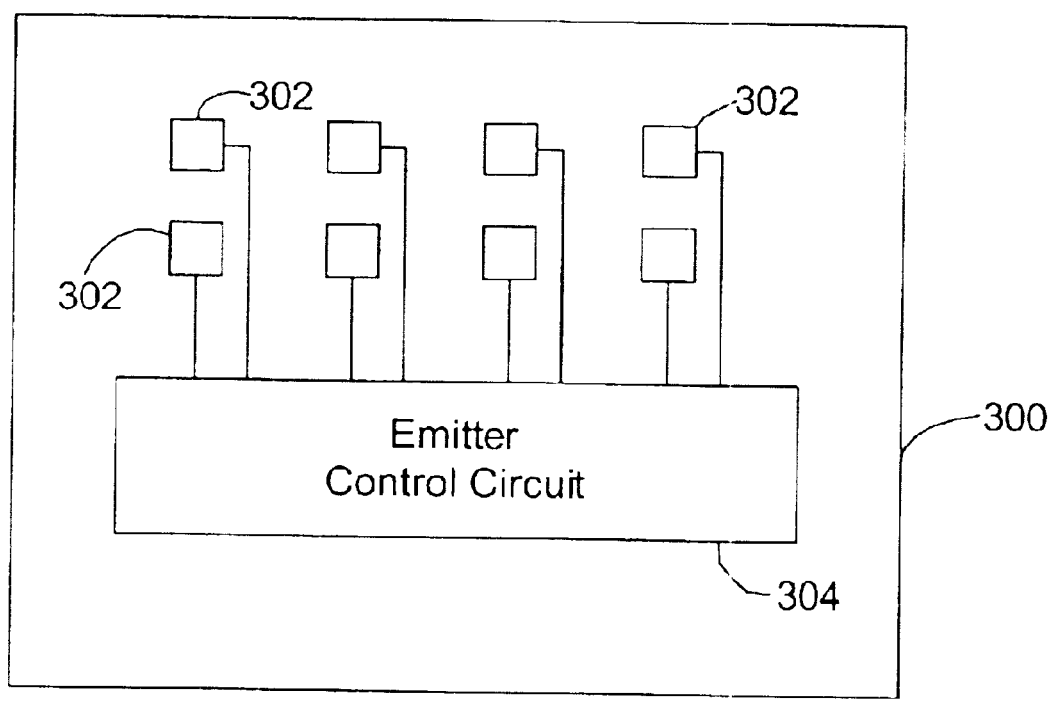
FIG. 3 is a schematic of a preferred embodiment integrated emitter circuit of the invention.

FIG. 3, for example, is a schematic of an exemplary integrated circuit embodiment 300 of the invention that includes at least one integrated emitter 302, and preferably a plurality of integrated emitters 302 arranged in an array or circuit interconnect pattern to connect the integrated emitters together. An emitter control circuit 304 is integrated onto the integrated circuit 300 and used to operate the at least one integrated emitter 302. Emitters 302 of the invention are thus incorporated into an integrated circuit, which is possible by virtue of the nature of the present emission layer.

Figure 4:
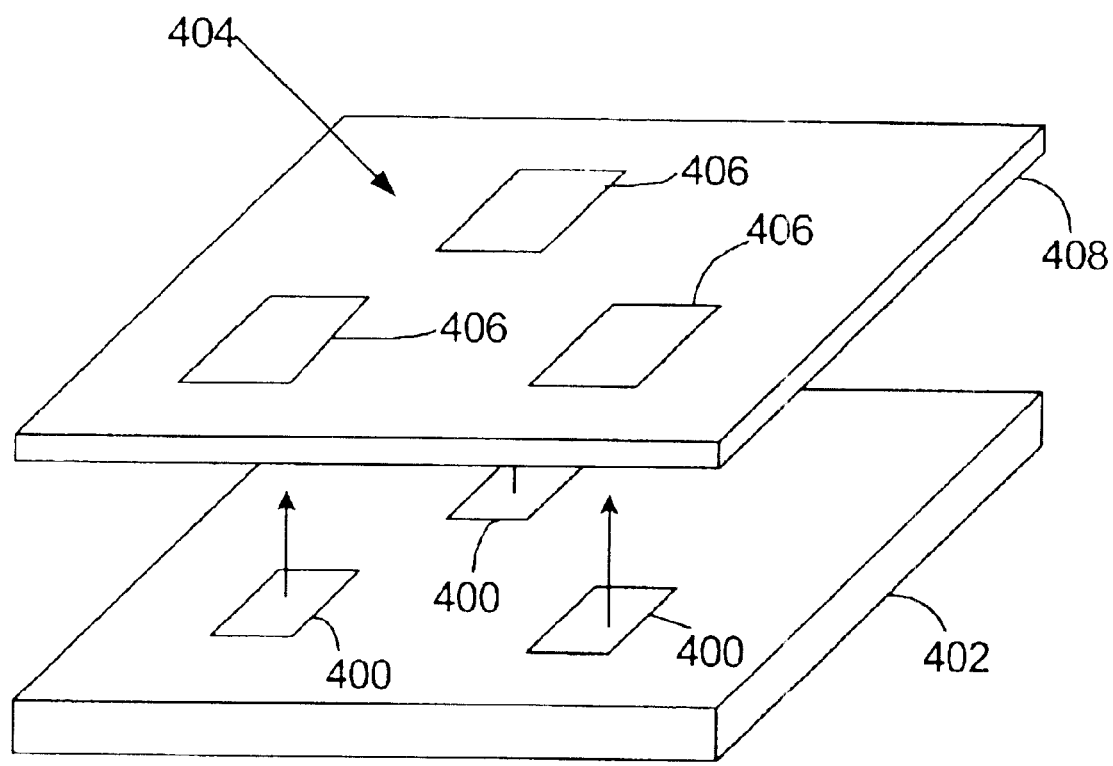
FIG. 4 is a schematic of a preferred embodiment emitter display device of the invention.

FIG. 4 is a schematic embodiment of a display application using an integrated emitter 400 of the invention. In particular, this embodiment entails a plurality of emitters 400 formed in an integrated circuit 402. Each of the emitters 400 emits electrons, as generally illustrated by the upwardly directed arrows of FIG. 4. An anode structure 404 having a plurality of individual pixels 406 that form a display 408 receives the emitted electrons. The pixels 406 are preferably a phosphor material that creates photons when struck by emissions from the emitters 400.

Figure 5A:
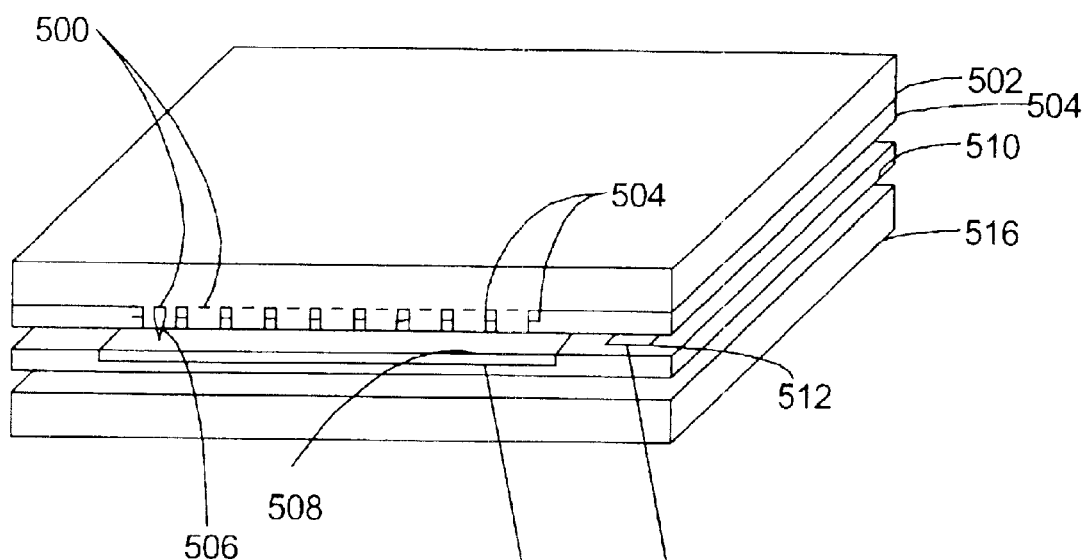
FIGS. 5A and 5B are schematics of a preferred embodiment emitter memory device of the invention.
Figure 5B:
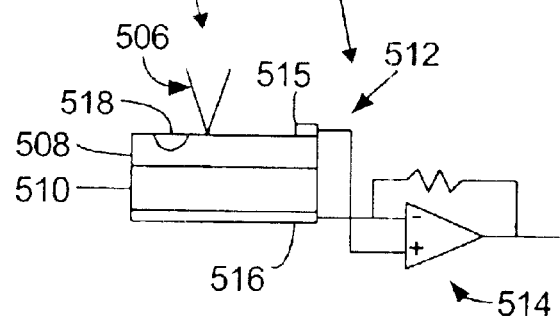

A particular preferred memory device is schematically shown in FIGS. 5A and 5B. The memory device includes integrated emitters 500. In this exemplary embodiment, an integrated circuit (IC) 502 including a plurality of integrated emitters 500 has a lens array 504 of focusing mechanisms aligned with the integrated emitters 500. The lens 504 is used to create a focused beam 506 that affects a recording surface made of a media 508. The media 508 is linked to a mover 510 that positions the media 508 with respect to the integrated emitters 500 on the IC 502. Preferably, the mover 510 has a reader circuit 512 integrated within. The reader circuit 512 is illustrated as an amplifier 514 making a first ohmic contact 515 to the media 508 and a second ohmic contact 516 to the mover 510, preferably a semiconductor or conductor substrate.

When a focused beam 506 strikes the media 508, and if the current density of the focused beam is high enough, the media is phase-changed to create an affected media area 518. When a low current density focused beam 506 is applied to the media 508 surface, different rates of current flow are detected by the amplifier 514 to create reader output. Thus, by affecting the media 508 with the energy from the emitter 500, information is stored in the media using structural phase changed properties of the media. An exemplary phase-change material is InSe. Other phase change materials are known to those skilled in the art.

Figure 6:
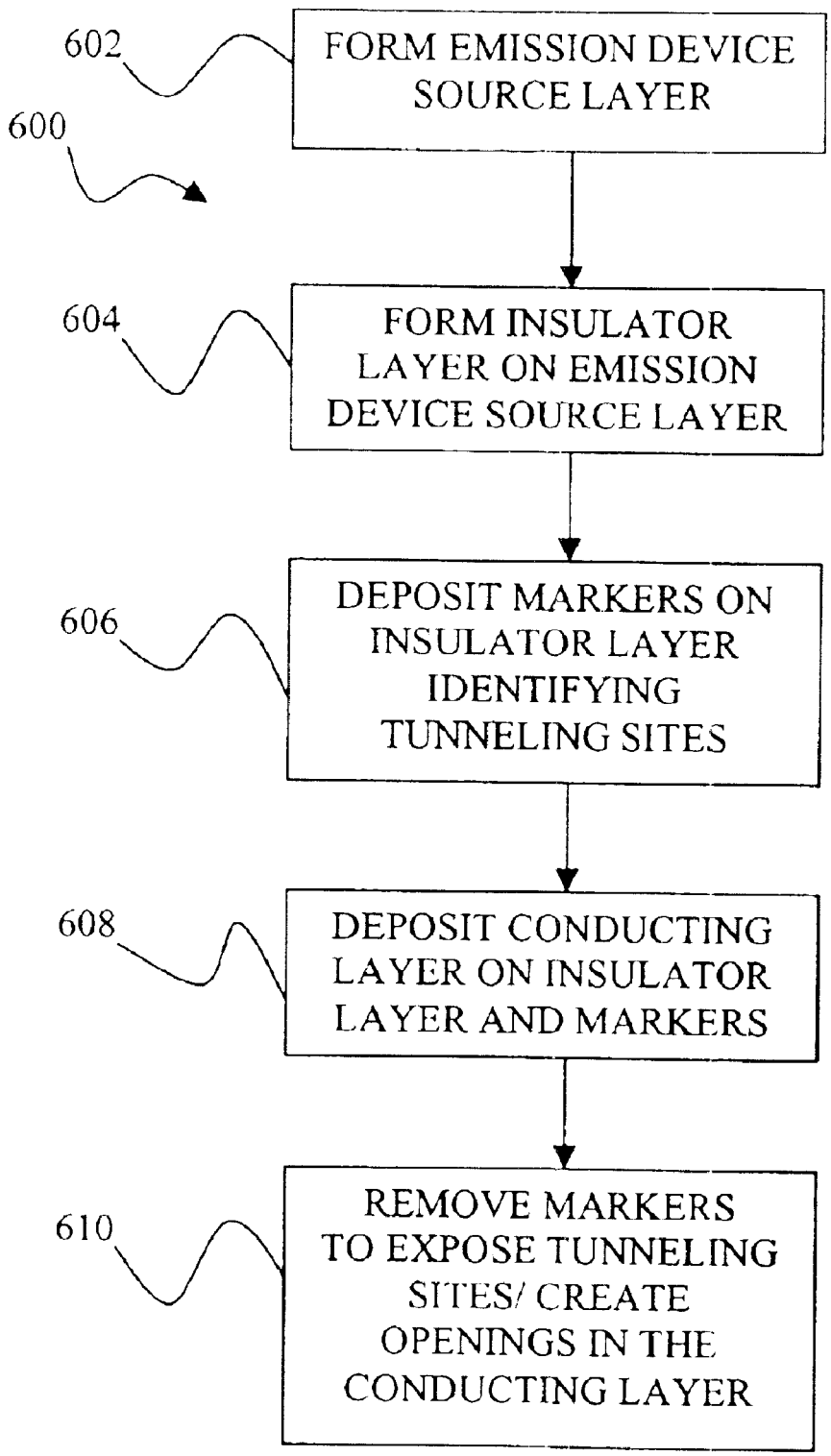
FIG. 6 is a flowchart illustrating a preferred embodiment method of making an emission device of the invention.

FIG. 6 is a flowchart illustrating steps of a preferred embodiment method 600 of making an emission device or emitter 10 of the invention. Preferred aspects of the preferred embodiment emitter 10 of FIG. 1, such as layer composition materials and layer thicknesses will likewise apply to a preferred method embodiment of the invention. With this in mind, a preferred method embodiment of the invention will be described with reference to the preferred embodiment emitter 10 by way of best illustrating the method embodiment.

Referring now to the flowchart of FIG. 6 as well as the emitter 10 of FIG. 1C, the preferred embodiment method 600 begins with a step of forming an emission device electron source layer 14 (step 602). Next, an insulating layer 16 is formed on the emission device source layer 14 to form a plurality of electron emitter structures (step 604). After formation of the insulating layer 16, the plurality of electron emitter structures have varied geometries and locations on the emission device source layer 14 due to the randomness of the processes of steps 602 and 604. Markers 20, formed of materials such as polymers, are then selectively deposited on the electron emitter structures 12 at their respective tunneling sites 18 via an electrodeposition process (step 606). Use of electrodeposition automatically places markers at the electron emissions sites. A conducting layer 22 is then deposited on the insulating layer 16 and markers 20 (step 608). Markers 20 are then removed, for example by annealing of the electron emitter structures 12 at temperatures up to 700 C for a time duration of 5 to 30 minutes in an oxygen environment, to expose tunneling sites 18 and create openings 24 in the conducting layer 22 (step 610). However, the maximum temperature, time duration, and determination of other conditions to anneal the electron emitter structures 12 is highly dependent upon the selected application, as well as the materials used to construct the conducting layer and polymer, as will be appreciated by those skilled in the art.

The insulating layer 16 and conducting layer 22 can be formed using a metal organic chemical vapor deposition process that is amenable to the incorporation of the invention into circuits and integrated circuit device applications. Those skilled in the art will recognize other appropriate deposition processes, such as wet chemistry, may be used for forming the electron emitter structures 12. Additionally, evaporation/sputtering processes are available for forming the source layer 14, insulating layer 16, and/or the conducting layer 22. Further, it will be understood that there are many additional and alternative steps to those discussed with reference to the preferred method 600 that may be practiced in other method embodiments. By way of example, additional conducting and/or insulating layers can be formed on the conducting layer 22 before the removal of the markers 20.

An alternative method of using markers 20 to facilitate electron emission from a plurality of electron emitter structures having varied geometries includes the step of providing a electron source substrate 14 formed of a metal or a semiconductor. An insulating layer 16 such as a dielectric, oxide layer is then formed or grown on the substrate to complete the plurality of electron emitter structures 12. These electron emitter structures 12 have one or more tunneling sites 18 for providing an electron emission current for use in electronic devices, such as field emission devices. Markers 20 are selectively deposited on the tunneling sites 18 followed by a conducting layer 22 formed on the electron emitter structures 12. Upon formation of the conducting layer 22, the markers 20 are removed from the tunneling sites 18 to expose the tunneling sites and provide openings 24 in the conducting layer. An advantage of forming the plurality of electron emitter structures in this manner is that the openings 24 enhance electron emissions from the insulating layer 16 since electrons are not colliding with structure, such as the conducting layer 22.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims. For example, it will be appreciated that many applications in addition to a memory and a visual display may be practiced using an emission device of the invention.

Various features of the invention are set forth in the appended claims.

What is claimed is:

1. An emission device comprising:
    a plurality of electron emitter structures having varied geometries, each of said plurality of electron emitter structures having one or more tunneling sites; and
    a conducting layer deposited on said plurality of electron emitter structures, wherein said conducting layer defines an opening for each of said one or more tunneling sites.

2. The device of claim 1, wherein said conducting layer is comprised of one or more of Al, Rh, Pt, Au, Ta, Cr, Mo, Ir, Ru, and Sn.

3. The device of claim 1, wherein said plurality of electron emitter structures further comprise an electron emission layer and an insulating layer formed on said electron emission layer.

4. The device of claim 3, wherein said insulating layer comprises one of an oxide layer and a nitride layer.

5. The device of claim 1, formed as part of an integrated emitter circuit, the integrated emitter circuit comprising:
    a substrate formed of one of a silicon and a polysilicon;
    an insulating layer on said substrate forming said plurality of electron emitter structures; and
    a circuit interconnect electrical contact structure on said conducting layer of said plurality of electron emitter structures.

6. The device of claim 5, wherein said insulating layer is a dielectric layer, said dielectric layer comprising an oxide or a nitride of Ti or Si.

7. The device of claim 5, wherein said electrical contact structure comprises part of a circuit interconnect pattern connecting the device to other devices in an integrated circuit.

8. The device of claim 1, formed as part of a memory device, the memory device using electron emissions from said plurality of electron emitter structures to cause an effect in a memory medium disposed opposite said plurality of electron emitter structures.

9. The device of claim 1, formed as part of a memory device, the memory device including said plurality of electron emitter structures and comprising:
    a lens for focusing an electron beam from said plurality of electron emitter structures to create a focused beam; and
    a memory medium in close proximity to said plurality of electron emitter structures, said memory medium having a storage area being in one of a plurality of states to represent information stored in said storage area, said plurality of states being responsive to said focused beam such that:
        an effect is generated in said storage area when said focused beam impinges upon said storage area;
        a magnitude of said effect depends upon said state of said storage area; and
        information in said storage area is read by measuring said magnitude of said effect.

10. The device of claim 9, further comprising:
    a mover to position said memory medium with respect to said plurality of electron emitter structures; and
    a reader circuit integrated in said mover.

11. The device of claim 1, formed as part of a display device, said display device further comprising:
    a lens for focusing an electron beam from said plurality of electron emitter structures; and
    a target anode medium to capture electrons emitted from said plurality of electron emitter structures.

12. The device of claim 1, formed as part of a display device, the display device further comprising:
    a lens for focusing an electron beam from said plurality of electron emitter structures; and
    a display medium in close proximity to said plurality of electron emitter structures, said display medium producing a visible emission in response to said focused beam.

13. A method for forming an emission device, comprising the steps of:
    forming a plurality of electron emitter structures;
    selectively depositing markers via an electrodeposition process on tunneling sites of said plurality of electron emitter structures;
    forming a conducting layer on said plurality of electron emitter structures; and
    removing said markers from said tunneling sites after formation of said conducting layer to provide openings in said conducting layer to expose said tunneling sites.

14. The method of claim 13, wherein said plurality of emitter structures are cold cathode polysilicon emitters.

15. The method of claim 13, wherein said markers are formed of one of a polymer and a metal.

16. The method of claim 15, wherein one of a trimethylsilane and an acrylonitrile is polymerized to form said polymer.

17. The method of claim 15, wherein said metal is selected from a group consisting of Cu, Ni, Sn, and Au.

18. The method of claim 13, wherein said markers are removed by annealing said plurality of electron emitter structures.

19. The method of claim 15, wherein said metal includes anions of chromium.

20. An emission device comprising:
    a plurality of electron emitter structures having varied geometries; and
    a conducting layer deposited on said plurality of electron emitter structures by selective deposition of markers on tunneling sites before depositing of said conducting layer, and removal of said markers from said tunneling sites after depositing of said conducting layer to form openings in said conducting layer.

21. The emission device of claim 20, wherein said markers are formed of one of a polymer and a metal.

22. The emission device of claim 20, wherein said metal layer is comprised of one or more of Al, Rh, Pt, Au, Ta, Cr, Mo, Ir, Ru, and Sn.

23. The emission device of claim 20, wherein said markers are removed by annealing said plurality of electron emitter structures.

24. The emission device of claim 20, wherein said plurality of electron emitter structures comprise:
   a substrate formed of one of a silicon and a polysilicon; and
   an oxide layer grown on said substrate.

25. The emission device of claim 20, wherein said openings are located at said tunneling sites for each of said plurality of electron emitter structures.

26. An emission device, comprising:
   a substrate formed of one of a silicon and a polysilicon;
   an oxide layer grown on said substrate to form a plurality of electron emitter structures having varied geometries and tunneling sites; and
   means for facilitating electron emission from said tunneling sites of said plurality of electron emitter structures.

27. The device of claim 26 wherein the means for facilitating electron emission comprises a conducting layer deposited on said plurality of electron emitter structures and having openings therethrough at each of said tunneling sites to prevent collisions of emitted electrons with said conducting layer.

* * * * *